United States Patent
Lang et al.

(10) Patent No.: US 11,539,836 B2
(45) Date of Patent: *Dec. 27, 2022

(54) DETECTING AND MITIGATING EFFECTS OF UNAUTHORIZED TELEPHONE NUMBER SPOOFING

(71) Applicant: AT&T Intellectual Property I, L.P., Atlanta, GA (US)

(72) Inventors: Howard Lang, Wayside, NJ (US); Joseph Soryal, Ridgewood, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/538,786

(22) Filed: Nov. 30, 2021

(65) Prior Publication Data
US 2022/0272192 A1    Aug. 25, 2022

Related U.S. Application Data

(63) Continuation of application No. 17/181,270, filed on Feb. 22, 2021, now Pat. No. 11,218,591.

(51) Int. Cl.
H04M 3/42    (2006.01)
H04M 3/436   (2006.01)

(52) U.S. Cl.
CPC ....... *H04M 3/436* (2013.01); *H04M 3/42059* (2013.01); *H04M 2203/2011* (2013.01)

(58) Field of Classification Search
None
See application file for complete search history.

(56) References Cited

U.S. PATENT DOCUMENTS

| | | | |
|---|---|---|---|
| 10,477,013 B1 | 11/2019 | Gayaldo | |
| 10,979,464 B1 | 4/2021 | Lang et al. | |
| 11,218,591 B1* | 1/2022 | Lang | H04M 3/436 |
| 2007/0286371 A1 | 12/2007 | Shima et al. | |
| 2011/0026701 A1 | 2/2011 | Kirchhoff et al. | |
| 2012/0027191 A1 | 2/2012 | Baril et al. | |
| 2016/0150414 A1 | 3/2016 | Flaks et al. | |

OTHER PUBLICATIONS

Notice of Allowance dated Aug. 31, 2021 for U.S. Appl. No. 17/181,270, 25 pages.

* cited by examiner

*Primary Examiner* — Harry S Hong
(74) *Attorney, Agent, or Firm* — Amin, Turocy & Watson, LLP

(57) ABSTRACT

The technologies described herein are generally directed to modeling radio wave propagation in a fifth generation (5G) network or other next generation networks. For example, a method described herein can include, facilitating, by a first device, receiving a first communication directed to a second device from a third device associated with a first telephone number. The method can further include determining, by the first device, that the first communication comprises a reference to a second telephone number different from the first telephone number, resulting in a number discrepancy. Further, based on the number discrepancy and an analysis of the first communication, the method can further include preventing, by the first device, communication of the first communication to the third device.

20 Claims, 10 Drawing Sheets

700 ─▶

702

FACILITATE RECEIVING A FIRST COMMUNICATION, DIRECTED TO A SECOND DEVICE FROM A THIRD DEVICE ASSOCIATED WITH A FIRST TELEPHONE NUMBER

COMMUNICATION RECEIVER 122

704

DETERMINING THAT THE FIRST COMMUNICATION COMPRISES A REFERENCE TO A SECOND TELEPHONE NUMBER DIFFERENT FROM THE FIRST TELEPHONE NUMBER, RESULTING IN A FIRST NUMBER DISCREPANCY

NUMBER DISCREPANCY COMPONENT 124

706

BASED ON THE FIRST NUMBER DISCREPANCY AND AN ANALYSIS OF THE FIRST COMMUNICATION

COMMUNICATION ANALYZING COMPONENT 126

708

PREVENTING, BY THE FIRST DEVICE, COMMUNICATION OF THE FIRST COMMUNICATION T THE THIRD DEVICE.

COMMUNICATION FACILITATING COMPONENT 127

DETECTING AND MITIGATING EFFECTS OF UNAUTHORIZED TELEPHONE NUMBER SPOOFING

RELATED APPLICATION

The subject patent application is a continuation of, and claims priority to, U.S. patent application Ser. No. 17/181,270, filed Feb. 22, 2021, and entitled "DETECTING AND MITIGATING EFFECTS OF UNAUTHORIZED TELEPHONE NUMBER SPOOFING," the entirety of which application is hereby incorporated by reference herein.

TECHNICAL FIELD

The subject application is related to implementation of telephony systems, and, for example, to different approaches to handling caller identification when placing calls.

BRIEF DESCRIPTION OF THE DRAWINGS

The technology described herein is illustrated by way of example and not limited in the accompanying figures in which like reference numerals indicate similar elements and in which:

FIG. 7 depicts a system where one or more functions of can facilitate detecting and mitigating effects of unauthorized telephone number use can be implemented, in accordance with one or more embodiments described above.

DETAILED DESCRIPTION

Figure 1:
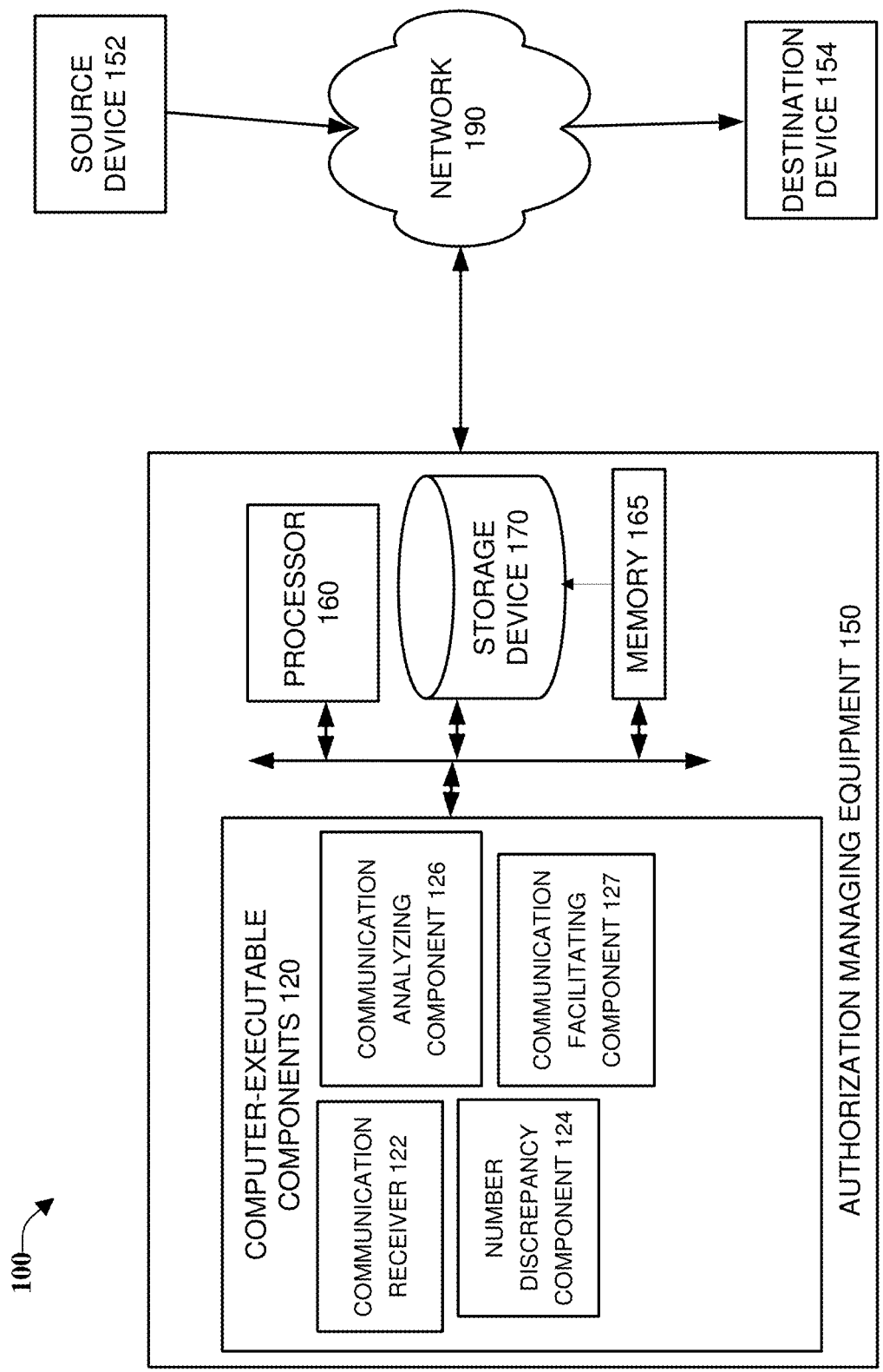
FIG. 1 is an architecture diagram of an example system that can facilitate detecting and mitigating effects of unauthorized telephone number use, in accordance with one or more embodiments.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate detecting and mitigating effects of unauthorized telephone number use. Different examples that describe these aspects are included with the description of FIGS. 1-10 below. It should be noted that the subject disclosure may be embodied in many different forms and should not be construed as limited to this example or other examples set forth herein.

Generally speaking, one or more embodiments can facilitate detecting and mitigating the effects of number spoofing in calls from originating devices. In addition, one or more embodiments described herein can be directed towards enhancing a multi-connectivity framework that supports the operation of new radio (NR, sometimes referred to as 5G). As will be understood, one or more embodiments can allow an integration of user devices with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

Networks that can be facilitated by one or more implementations described herein can include a wireless communication system, and thus can include one or more communication service provider networks that facilitate providing wireless communication services to various user equipment included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud-based networks, and the like.

In some embodiments the non-limiting terms "signal propagation equipment" or simply "propagation equipment," "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., real-time analysis of large amounts of calls to assess whether unauthorized number changes have occurred), that are not abstract and cannot be performed as a set of mental acts by a human. For example, a human, or even a plurality of humans, cannot efficiently assess whether a originating number was changed for authorized or unauthorized (which cannot be performed manually by a human) and detailed analysis of information about a wireless connection, with the same level of accuracy and/or efficiency as the various embodiments described herein Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate detecting and mitigating effects of unauthorized identifiers in a telephone call context, e.g., telephone numbers. It should be noted that the subject disclosure may be embodied in many different forms and should not be construed as limited to this example or other examples set forth herein, e.g., some embodiments described and suggested herein can also apply to other types of communication, such as text messaging.

FIG. 1 is an architecture diagram of an example system 100 that can facilitate detecting and mitigating effects of unauthorized telephone number use, in accordance with one or more embodiments. For purposes of brevity, description of like elements and/or processes employed in other embodiments is omitted.

In exemplary embodiments, a telephone call can be detected that is made with a caller identification (ID) that is different from the telephone number of the telephone making the call, e.g., a call originating from a telephone with the number 703-555-5555 contains caller ID information such that the call appears to originate from a telephone with the number 703-555-6666. While this example is used throughout this disclosure, one having skill in the relevant art(s), given the description herein would appreciate that the approaches can also apply to telephones that are VoIP devices (e.g., user equipment described with FIG. 9 below) as well as other devices that can originate telephone calls. Additionally, communications that can be handled by one or more embodiments can also be other types of communication that originate at a source that can be provided at a destination and can be changed, e.g., short message service (SMS) protocol messages, and other types of communication. It should also be noted that the telephone number as a caller ID value can also be analyzed by one or more embodiments, by other identifying information, e.g., name of caller, business name, and other types of device identifiers.

One or more embodiments described herein are directed to detecting communications made with a source identification that differs from the actual source of the communication. Such types of communication can be originated based on lawful and unlawful intent. For example, in an unlawful activity often termed "spoofing," a caller can use an alternate source identification in order to defraud a person receiving the call, e.g., a criminal posing as a person collecting money for a charity. Alternately, in a lawful activity, a customer service agent can call a customer with a general information number and the business name in the caller ID of the call, or a doctor can call a patient at home from a mobile device of which the doctor seeks to conceal the telephone number. Conventionally, problems in determining the authorized or unauthorized nature of caller ID number changes can lead to problems both in preventing harmful use and facilitating beneficial use, of this capability.

In some circumstances, one or more embodiments can address these problems by performing actions that include, but are not limited to, identifying unauthorized and authorized number changes, with the former being blocked and potentially investigated, and the latter being permitted. For convenience, as described herein, the former example can be referenced as an unauthorized ID change and the latter being termed an authorized ID change, e.g., authorized or unauthorized by telecommunications carriers, government regulations, or other similarly situated entities.

As depicted, system 100 can include authorization managing equipment 150 communicatively coupled to source device 152 and destination device 154 via network 190. In one or more embodiments, authorization managing equipment 150 can include computer executable components 120, processor 160, storage device 170, and memory 165. Computer executable components 120 can include communication receiver 122, number discrepancy component 124, communication analyzing component 126, communication facilitating component 127, and other components described or suggested by different embodiments described herein that can improve the operation of system 100. Embodiments that can use different combinations of these components are described throughout this disclosure.

It should be appreciated that the embodiments of the subject disclosure depicted in various figures disclosed herein are for illustration only, and as such, the architecture of such embodiments are not limited to the systems, devices, and/or components depicted therein. For example, in some embodiments, authorization managing equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

According to multiple embodiments, network 190 can comprise, but is not limited to, wired and wireless networks, including, but not limited to, a cellular network, a wide area network (WAN) (e.g., the Internet) or a local area network (LAN). For example, system 100 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 170 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

According to multiple embodiments, memory 165 can store one or more computer and/or machine readable, writable, and/or executable components and/or instructions 120 that, when respectively executed by processor 160, can facilitate performance of operations defined by the executable component(s) and/or instruction(s). Generally, applications (e.g., computer executable components 120) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices For example, in one or more embodiments, computer executable components 120 can be used in connection with implementing one or more of the systems, devices, components, and/or computer-implemented operations shown and described in connection with FIG. 1 or other figures disclosed herein. In one or more embodiments described and suggested herein, computer executable components 120 can include instructions that, when executed by processor 160, can facilitate performance of operations defining communication receiver 122. As discussed below, communication receiver 122 can, in accordance with one or more embodiments, facilitate receiving a first communication, directed to destination device 154 from source device 152 associated with a first telephone number, e.g., 703-555-5555 from the example noted above.

Continuing the example, in one or more embodiments, computer executable components 120 can further include instructions that, when executed by processor 160, can facilitate performance of operations defining number discrepancy component 124. As discussed below, discrepancy component 124 can, in accordance with one or more embodiments, determine that the first communication comprises a reference to a second telephone number different from the first telephone number, resulting in a source number discrepancy, e.g., with the communication referencing 703-555-6666 instead of 703-555-5555.

In one or more example embodiments, computer executable components 120 can include further instructions that, when executed by processor 160, can facilitate performance of operations defining communication analyzing component 126. As discussed below, communication analyzing component 126 can, in accordance with one or more embodiments, based on the source number discrepancy and an analysis of the first communication, prevent communication (e.g., relay, routing, directing) of the first communication to destination device 154.

It should be noted that the above example combinations of features are described below with the remaining figures, e.g., FIGS. 2, 6, and 7 describe an example component that can be embedded in source device 152 to provide one way of aiding the identification of communications as having an unauthorized or authorized ID change, with other approaches to aiding identification discussed with FIGS. 3 and 4 below.

It should further be noted that, in one or more embodiments, system 100 and other embodiments described herein can employ hardware and/or software to solve problems that are highly technical in nature, including improving the prevention of unauthorized ID changes in communications. One having skill in the relevant art(s), given the disclosure herein, would appreciate that the technical problems that can be solved by one or more embodiments described herein are not abstract and cannot be performed as a set of mental acts by a human.

Further, in certain embodiments, some of the processes performed can be performed by one or more specialized computers (e.g., one or more specialized processing units, a specialized computer such as tomography and reconstruction, statistical estimation, specialized routing analysis, and so on) for carrying out defined tasks related to the large-scale detection and mitigation of unauthorized ID changes. System 100 and/or components of the system can be employed to solve new problems that arise through advancements in technologies mentioned above, computer architecture, and/or the like.

The above-described background relating to network hardware is merely intended to provide a contextual overview of some current issues, and is not intended to be exhaustive. Other contextual information may become further apparent upon review of the following detailed description.

Figure 2:
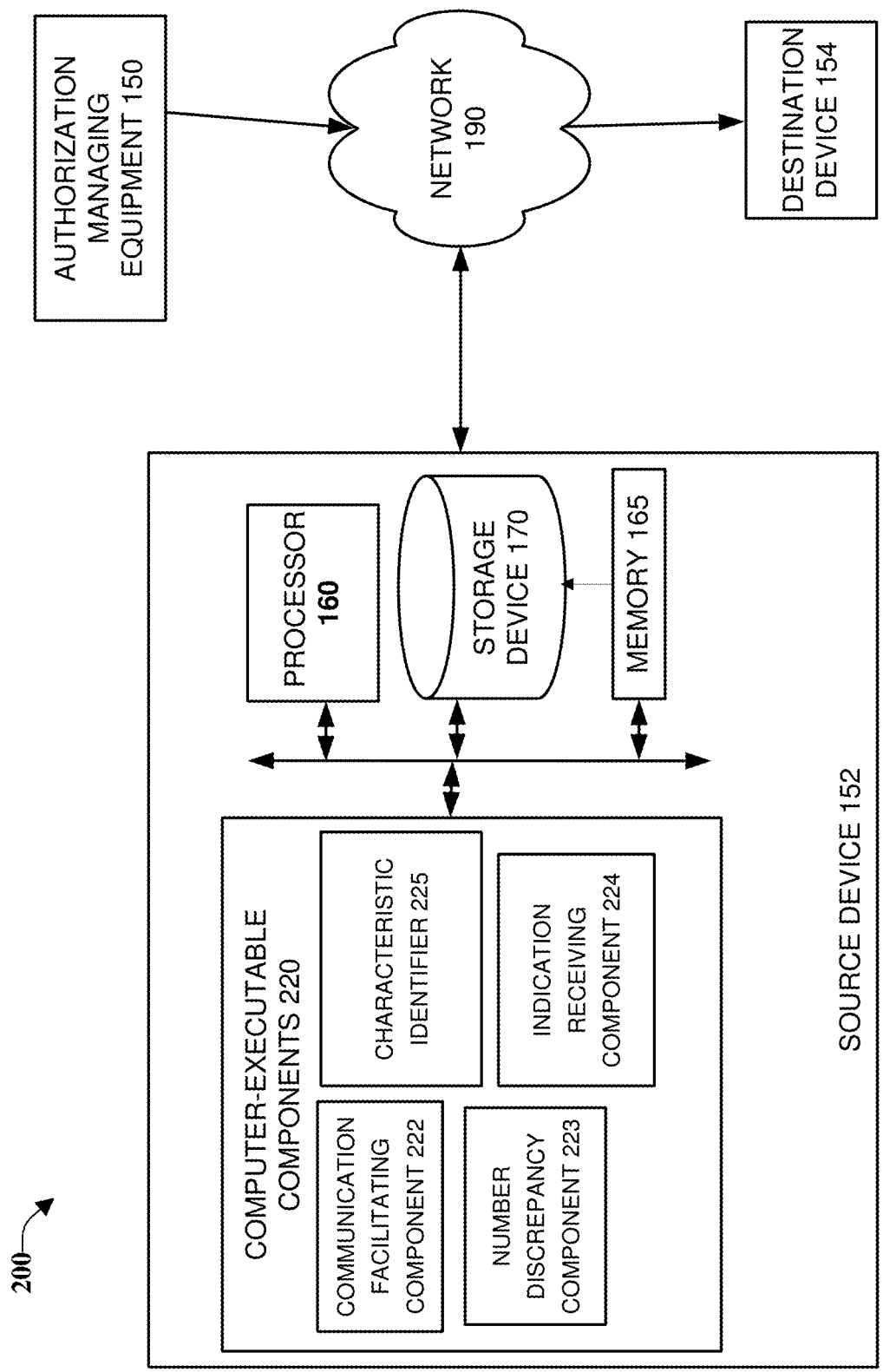
FIG. 2 is a diagram of a non-limiting example system that can facilitate detecting and mitigating effects of unauthorized telephone number use, in accordance with one or more embodiments.

FIG. 2 is a diagram of a non-limiting example system 200 that can facilitate detecting and mitigating effects of unauthorized telephone number use, in accordance with one or more embodiments. For purposes of brevity, description of like elements and/or processes employed in other embodiments is omitted.

According to multiple embodiments, system 200 can include source device 152, authorization managing equipment 150, and destination device 154, connected via network 190. For system 200, source device 152 of FIG. 1 is described in additional detail, and can include memory 165 that can store one or more computer and/or machine readable, writable, and/or executable components and/or instructions 220 that, when respectively executed by processor 160, can facilitate performance of operations defined by the executable component(s) and/or instruction(s).

For example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 120 can include instructions that, when executed by processor 160, can facilitate performance of operations defining communication facilitating component 222, number discrepancy component 223, characteristic identifier 225, and indication receiving component 224, and other components described or suggested by different embodiments described herein that can improve the operation of system 200. Embodiments that can use different combinations of these components are described throughout this disclosure.

For example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 160, can facilitate performance of operations defining communication facilitating component 222. As discussed below, communication facilitating component 222 can, in accordance with one or more embodiments communicate a communication for destination device 154 to authorization managing equipment 150.

Continuing the example, in one or more embodiments, computer executable components 120 can include instructions that, when executed by processor 160, can facilitate performance of operations defining number discrepancy component 223. In this example, the communication can include a first telephone number for display at destination device 154 that is different from a second phone number associated with the source device 152, resulting in a number discrepancy. In some circumstances, number discrepancy component 223 can, in accordance with one or more embodiments identify the number discrepancy.

Continuing the example, in one or more embodiments, computer executable components 120 can include instructions that, when executed by processor 160, can facilitate performance of operations defining indication receiving component 224. In some circumstances, indication receiving component 224 can, in accordance with one or more embodiments, receive an indication that the communication was not communicated to the destination device 154, notwithstanding the communication being directed to destination device 154. As described herein, one or more embodiments can facilitate the prevention of the call initiated by source device 152 for different reasons, e.g., an identified number discrepancy is not determined to be an authorized ID change by authorization managing equipment 150.

Figure 4:
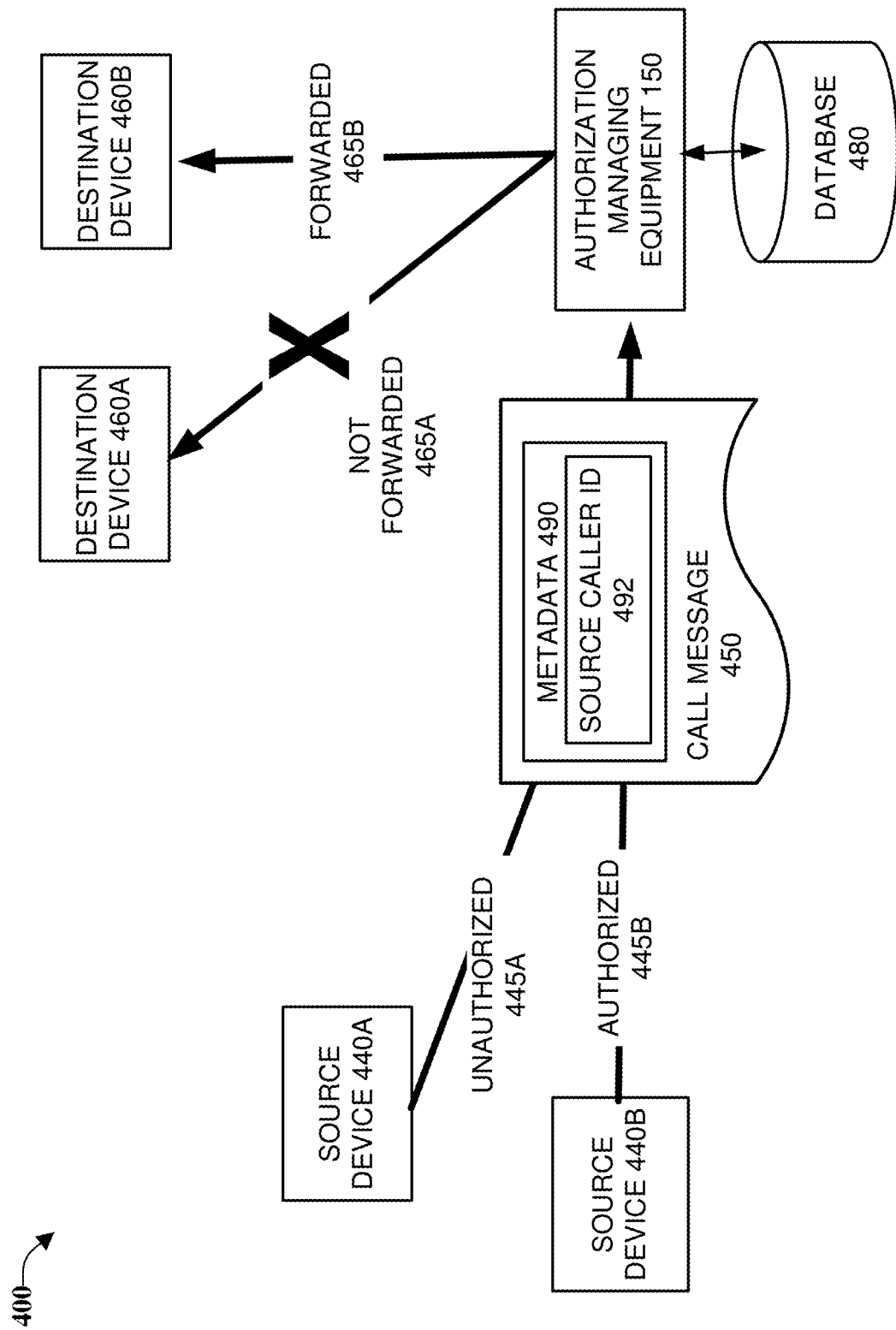
FIG. 4 is a diagram of a non-limiting example system that can facilitate using communication metadata to detect and mitigate effects of unauthorized telephone number use, in accordance with one or more embodiments.
Figure 5:
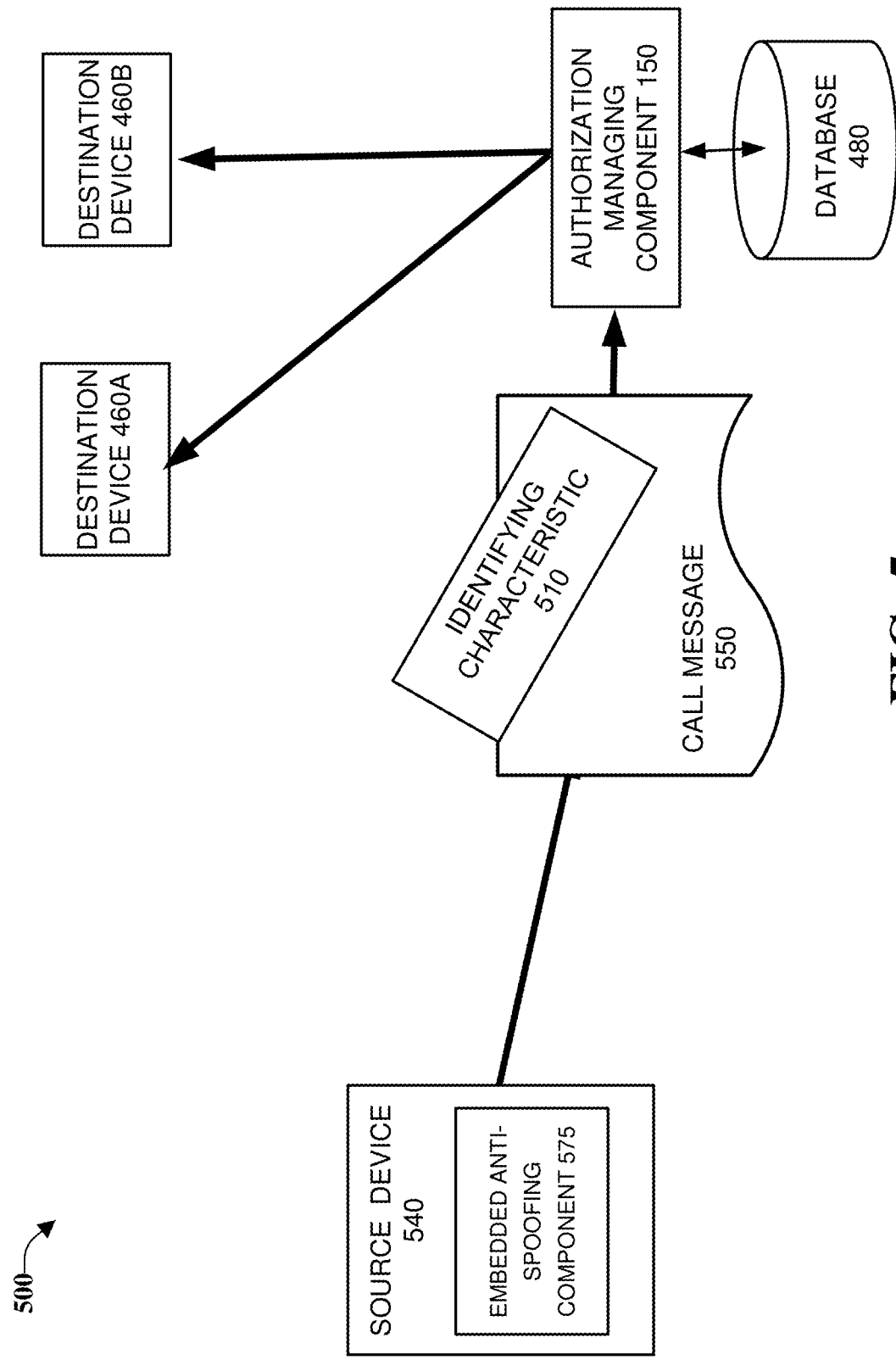
FIG. 5 is a diagram of a non-limiting example system that can utilize additional information combined with communications to facilitate detecting and mitigating effects of unauthorized telephone number use, in accordance with one or more embodiments.

For example, in FIG. 4, characteristics of the communication can be analyzed by authorization managing equipment 150, and the characteristics cause a determination that the communication is to be prevented from propagation to destination device 154. In FIG. 5, instead of, or in addition to the message characteristics discussed with FIG. 4, an embedded client-side component in source device 152 can, determine additional information about source device 152 and relay this information with the communication to aid authorization managing equipment 150 in identifying unauthorized ID changes. In some instances of embodiments described with FIG. 6 below, instead of, or in addition to the message characteristics discussed with FIGS. 4 and 5, the component embedded in source device 152 can be used to independently determine that a communication has an authorized or unauthorized ID change, with this determination being attached to the communication as a notification to other system components, e.g., communication analyzing component 126 of authorization managing equipment 150.

Figure 3:
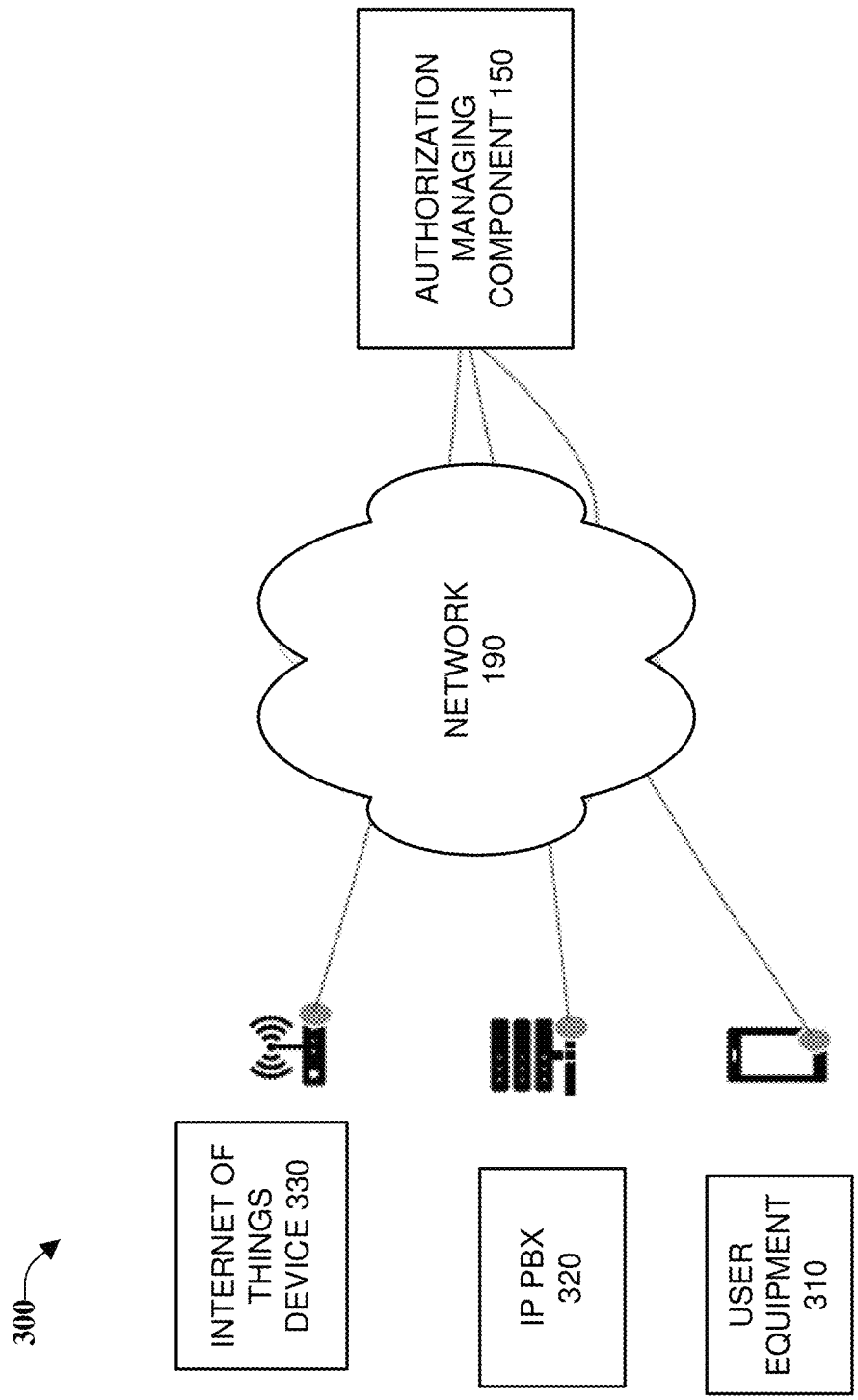
FIG. 3 is a diagram of a non-limiting example system that can facilitate detecting and mitigating effects of unauthorized telephone number use, in accordance with one or more embodiments.

FIG. 3 is a diagram of a non-limiting example system 300 that can facilitate detecting and mitigating effects of unauthorized telephone number use, in accordance with one or more embodiments. For purposes of brevity, description of like elements and/or processes employed in other embodiments is omitted. System 300 includes three different source devices that can be used to implement one or more embodiments described herein, e.g., user equipment 310, IP PBX 320, and internet of thing (IoT) device 330. The source devices are depicted as communicatively coupled to authorization managing equipment 150 via network 190.

It should be noted that one or more embodiments can be beneficially applied to handling number spoofing for a variety of source communication devices. One having skill in the relevant art(s), given the description herein would appreciate that rapid and accurate analysis and handling of placed calls will be important for the expected increase in connected communications equipment. Further, as discussed with FIGS. 5-6 below, utilizing one or more embodiments with IP PBX 320 can be beneficial in the carrying of telephonic communications that originate from business sources, such as call centers.

As would further be appreciated by one having skill in the relevant art(s), given the description herein different entities from call centers placing calls through domestic carriers to the domestic carriers themselves, can be provided incentives for participating in the call analysis processes described herein. For example, a call center that refuses to participate in different information sharing measures that can facilitate identifying unauthorized number spoofs, (e.g., discussed with FIGS. 5-6 below) can be denied access to calling via particular carriers. In another example, a carrier that originates calls in a telecommunications system for destination devices of another carrier, can be prevented from accessing the destination devices, if participation in some of the processes described herein is not performed.

Figure 6:
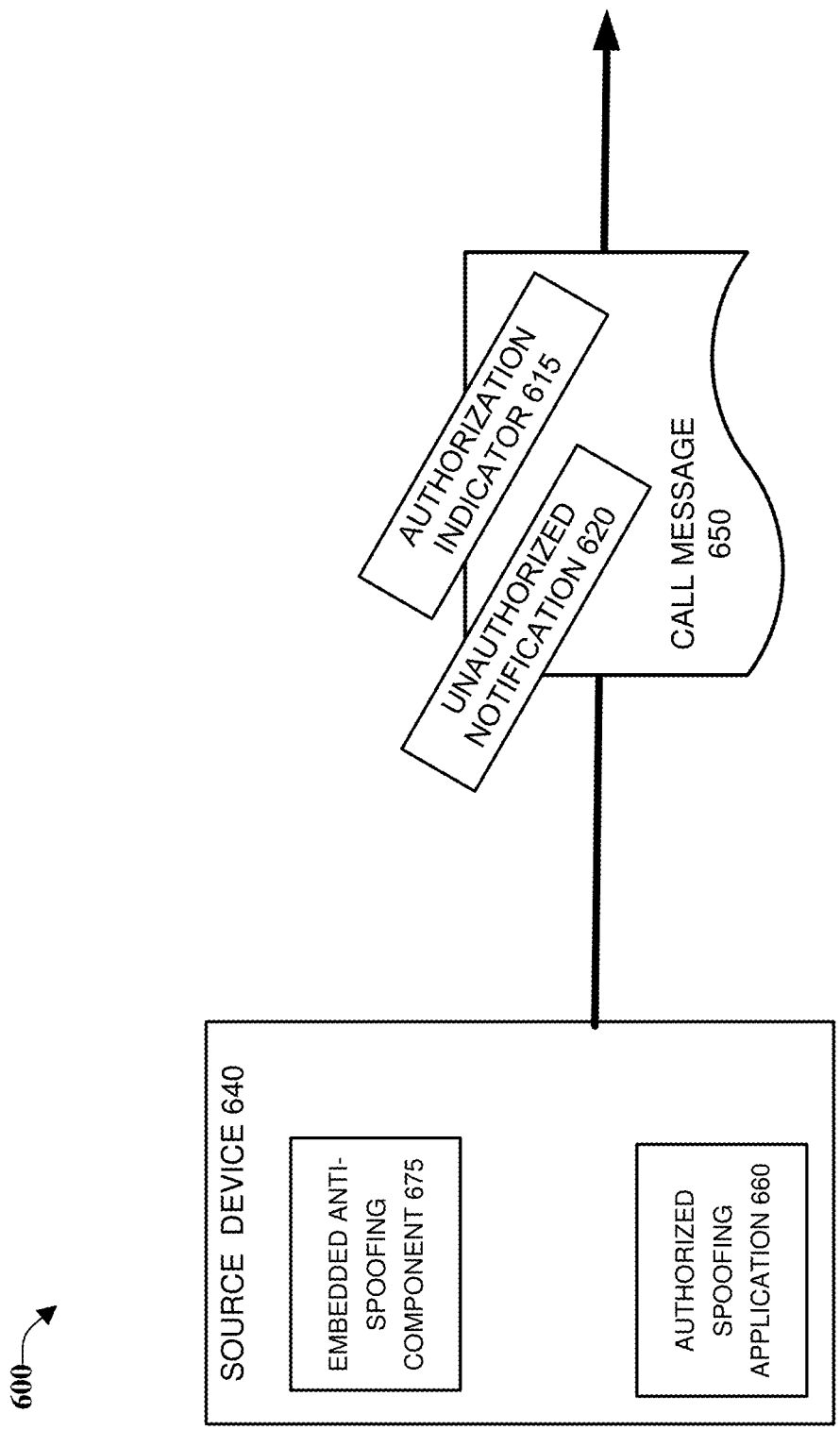
FIG. 6 is a diagram of a non-limiting example system that can facilitate detecting and mitigating effects of unauthorized telephone number use, in accordance with one or more embodiments.

FIGS. 4-6 illustrate different example approaches that can be used to handle call messages directed from source devices 440A-B to destination devices 460A-B. In FIG. 4, existing metadata of a telephone call can be analyzed to detect unauthorized and authorized use of different call identifiers, in FIG. 5, source devices can detect and add additional metadata to a telephone call to facilitate detection, and FIG. 6 depicts detection and notification by a source device. One having skill in the relevant art(s), given the descriptions and suggestions herein, would appreciate that one or more approaches described with FIGS. 4-6 can be combined by embodiments to facilitate some of the results described herein.

FIG. 4 is a diagram of a non-limiting example system 400 that can facilitate using communication metadata to detect and mitigate effects of unauthorized telephone number use, in accordance with one or more embodiments. For purposes of brevity, description of like elements and/or processes employed in other embodiments is omitted.

In one or more embodiments, system 400 can include source devices 440A-B, authorization managing equipment 150, and destination devices 460A-B. To illustrate aspects of one or more embodiments, system 400 includes call message 450 being communicated from source devices 440A-B to be delivered via authorization managing equipment 150 to destination devices 460A-B respectively. In this example, authorization managing equipment 150 is depicted with access to database 480.

It should be noted that referencing call message 450 herein is a way of describing how one or more embodiments handle a communication directed under the auspices of source device identifier, e.g., VoIP telephone call packets with source caller ID 492 metadata 490. In an example, authorization managing equipment 150 can receive call message 450 directed to destination device 460A from source device 440A.

In an example, authorization managing equipment 150 can, based on analysis, can initially determine that source device 440A is using a number for call message 450 that differs from the number of source device 440A (e.g., by number discrepancy component 124), and based on this, subsequently, can estimate (e.g., by communication analyzing component 126) that call message 450 has a destination of destination device 460A, and that the number change is not authorized, e.g., is unauthorized 445A. Based on the determination of unauthorized 445A number use, one or more embodiments can prevent delivery of call message 450 to destination device 460A by the first device, e.g., call message 450 is not forwarded 465A.

Alternatively, authorization managing equipment 150 can, in another example, based on analysis, after a determination that source device 440B is using a number for call message 450 that differs from the number of source device 440B (e.g., by number discrepancy component 124), and based on this, subsequently, can estimate (e.g., by communication analyzing component 126) that call message 450 has a destination of destination device 460B, and that the number change is authorized 445B. Based on the determination of authorized 445B number use, one or more embodiments can facilitate delivery (e.g., by communication facilitating component 127) of call message 450 to destination device 460B by authorization managing equipment 150.

With respect to prevention or facilitating of the delivery of call message 450, different embodiments can use one or a combination of multiple approaches. With the example of FIG. 4, both the determination of a number discrepancy and the estimation of the authorized nature of the message can be performed using metadata 490. For example, different characteristics can be stored and available to assist analysis by authorization managing equipment 150, including but not limited to, records of devices (e.g., destination device 460B) that are used by authorized users, e.g., law enforcement, healthcare workers, and counselors. It should be noted that this assessment of call message 450 based on an identification of the likely human controller of source devices 440A-B can be combined with other approaches described herein a well.

In another example, device location records can be used to estimate whether source device 440A has location pings at an interval that indicates that different devices are being used, e.g., an hour between pings from New York and Los Angeles. It would be appreciated that these example approaches can be combined as well, e.g., once a device is identified as using an unauthorized number change, an identifier for this device (e.g., a characteristic of the device) can be stored for future identification.

It should be noted that, while one or more embodiments can utilize information provided by source devices 440A-B, a setting of the source devices can be used to disable the sharing of this information. It should also be noted that, for other examples discussed herein, this user control over sharing can be used for these examples, whether or not this disclosure described this capability.

FIG. 5 is a diagram of a non-limiting example system 500 that can utilize additional information combined with communications to facilitate detecting and mitigating effects of unauthorized telephone number use, in accordance with one or more embodiments. For purposes of brevity, description of like elements and/or processes employed in other embodiments is omitted. In contrast to the examples of FIG. 4, where authorized or unauthorized status was determined solely by information available to and analysis performed by authorization managing equipment 150, FIGS. 5-6 can combine information provided by, and analysis performed by source device 540, e.g., an embedded component that can exchange data with authorization managing equipment 150.

In one or more embodiments, system 500 can include source device 440A-B, authorization managing equipment 150, and destination devices 460A-B. To illustrate aspects of one or more embodiments, system 400 includes call message 550 being communicated from source devices 440A-B to be delivered via authorization managing equipment 150 to destination devices 460A-B respectively. In this example, authorization managing equipment 150 is depicted with access to database 480.

In one or more embodiments, embedded anti-spoofing component 575 can be an application operating on source device 540 that can supplement information included with call message 550. As noted with FIG. 4 above, one or more embodiments can of authorization managing equipment 150 identify unauthorized alternate numbers based on information included with call message 550. In FIG. 5, to improve the accuracy and speed with which unauthorized alternate numbers can be identified and classified (e.g., as authorized or unauthorized) by embodiments, embedded anti-spoofing component 575 can add additional information to call message 550 including, but not limited to identifying characteristics 510 of source device 540, including values such as hardware specifications of device, operating system version, applications installed on device with installation dates, and recent location points. Applications installed on source device 540 that can be highlighted by information provided include applications providing number spoofing operating on source device 540, e.g., applications such as those recognized as used for legitimate spoofing (e.g., medical and call center applications), as well as applications recognized to be often used for illegitimate purposes. As noted above, authorization managing equipment 150 can cross-reference information, such as identifying characteristics 510 in database 480 with other data.

FIG. 6 is a diagram of a non-limiting example system 600 that can facilitate detecting and mitigating effects of unauthorized telephone number use, in accordance with one or more embodiments. For purposes of brevity, description of like elements and/or processes employed in other embodiments is omitted.

In one or more embodiments, system 600 can include source device 640 with embedded anti-spoofing component 675, sensors 670, and authorized spoofing application 660. Source device directs call message 650 to a destination device (not shown) and this message includes additional notification and indicator information about spoofing by source device 640, e.g., including, but not limited to, unauthorized notification 620 and authorization indicator 615.

In a variation of the embodiments described with FIG. 5 above, in FIG. 6, source device 640 can not only provide identifying characteristics of source device 640 for analysis by authorization managing equipment 150, embedded anti-spoofing component 675 can perform analysis to make the assessment of whether a call uses an authorized or unauthorized alternate phone number. Based on this determination, source device 640 can include an indicator of the results of the analysis along with call message 650, e.g., authorization indicator 615 and unauthorized notification 620. These indicators can be received by authorization managing equipment 150 and either be sufficient to establish the authorization status of call message 650 or by used as a part of a broader analysis of call message 650 by authorization managing equipment 150.

In another example, source device 640 can be an originating device in a call center, with embedded anti-spoofing component 675 being installed on an individual device or on and premises router (VoIP). In some instances, embedded anti-spoofing component 675 can allow source device 640 to add additional metadata to a call center call to provide additional identifying characteristics 510 for use by authorization managing equipment 150. For example, in some embodiments, a business name, call purpose, originating location and other characteristics can be included as identifying characteristics 510 for analysis by authorization managing equipment 150 and potentially providing to destination device 460A, e.g., for use by the destination user to determine whether to accept the call.

As noted above with the discussion of system 600, embedded anti-spoofing component 675 can also provide on-site analysis of aspects of a call-center call, to determine whether alternate number usage should be determined to be authorized or not, e.g., providing authorization indicator 615 if so determined.

FIG. 7 depicts a system 700 where one or more functions of authorization managing equipment 150 described above can be implemented, in accordance with one or more embodiments described above. For purposes of brevity, description of like elements and/or processes employed in other embodiments is omitted.

In one or more embodiments, authorization managing equipment 150 can be implemented in a software platform that includes several interconnected components. As depicted, system 700 includes communication receiver 122, discrepancy component 124, communication analyzing component 126, communication facilitating component 127.

In an example, component 702 can include the functions of communication receiver 122, supported by the other layers of system 700. For example, component 702 can facilitate receiving a first communication, directed to a second device from a third device associated with a first telephone. For example, in one or more embodiments communication receiver 122 can facilitate receiving by authorization managing equipment call message 450, directed to destination device 460A from source device 440A.

In an example, component 704 can include the functions of number discrepancy component 124, supported by the other layers of system 700. For example, component 704 can facilitate determining, by the first device, that the first communication comprises a reference to a second telephone number different from the first telephone number, resulting in a first number discrepancy. For example, in one or more embodiments number discrepancy component 124 can determine that call message 450 comprises a reference to a telephone number different from the telephone number associated with source device 440A, resulting in a first number discrepancy.

In an example, component 706 can include the functions of communication analyzing component 126, supported by the other layers of system 700. For example, component 706 can facilitate identifying a number discrepancy based on the first number discrepancy and an analysis of the first communication. For example, in one or more embodiments communication analyzing component 126 can facilitate identifying a number discrepancy based on the first number discrepancy and an analysis of the first communication.

In an example, component 708 can include the functions of communication facilitating component 127, supported by the other layers of system 700. For example, component 708 can facilitate preventing communication of the first communication to the third device. For example, in one or more embodiments, communication facilitating component 127 can facilitate preventing communication of call message 450 to destination device 460A, e.g., because the detected number discrepancy is determined to be unauthorized. In an alternate embodiment, the analysis that caused the prevention could have been performed on source device 440A by embedded anti-spoofing component 675, and unauthorized notification 620 can have been included with call message 650 to notify authorization managing equipment 150 of the message status.

Figure 8:
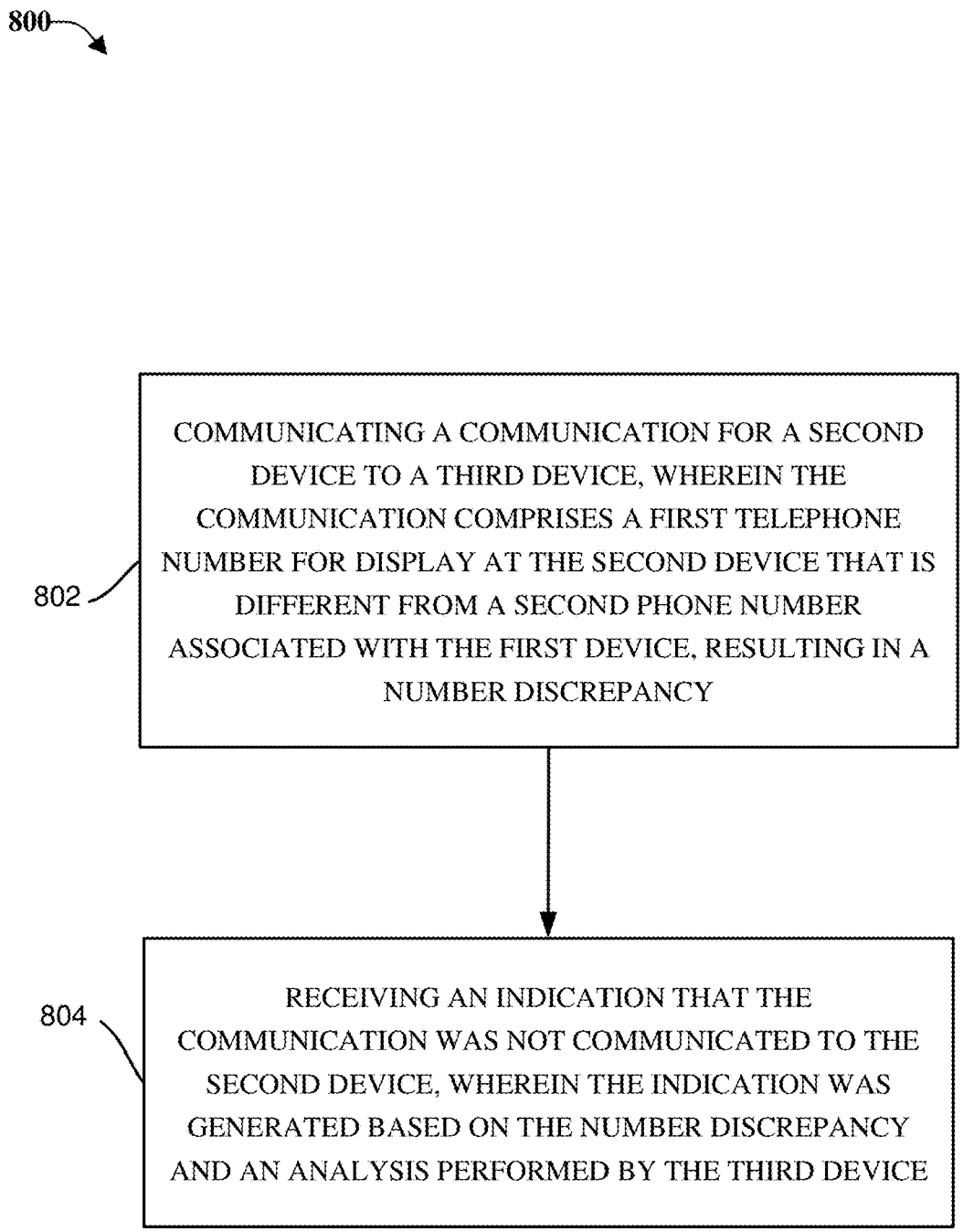
FIG. 8 illustrates an example method that can facilitate detecting and mitigating effects of unauthorized telephone number use, in accordance with one or more embodiments.

FIG. 8 illustrates an example method 800 that can facilitate allocating power allocations to implementations of different RATs, in accordance with one or more embodiments. For purposes of brevity, description of like elements and/or processes employed in other embodiments is omitted.

At 802, method 800 can include, sending a communication for a second device to a third device, with the communication including a first telephone number for display at the second device that is different from a second phone number associated with the first device, resulting in a number discrepancy. For example, in one or more embodiments, source device 440A can communicate call message 450 for destination device 460A to authorization managing equipment 150, with the communication including a first telephone number for display at destination device 460A that is different from a second phone number associated with source device 440A, resulting in a number discrepancy At 804, method 800 can include receiving an indication that the communication was not communicated to the second device, with the indication being generated based on the number discrepancy and an analysis performed by the third device. Continuing the example above, in one or more embodiments, source device 440A can receive an indication that call message 450 was not communicated to destination device 460A, with the indication being generated by authorization managing equipment 150 based on the number discrepancy and an analysis performed by one or more of authorization managing equipment 150 and embedded antispoofing component 675.

Figure 9:
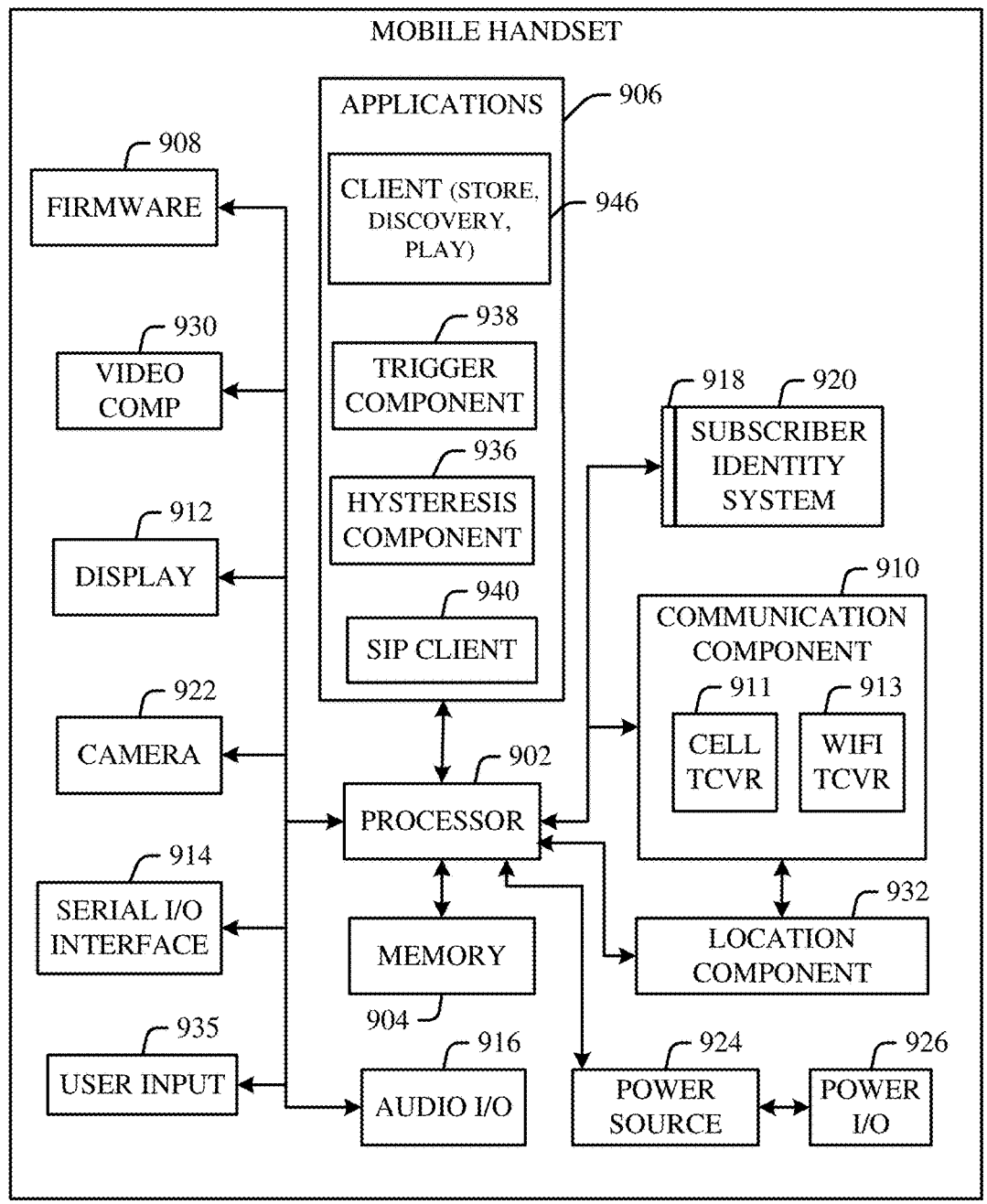
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
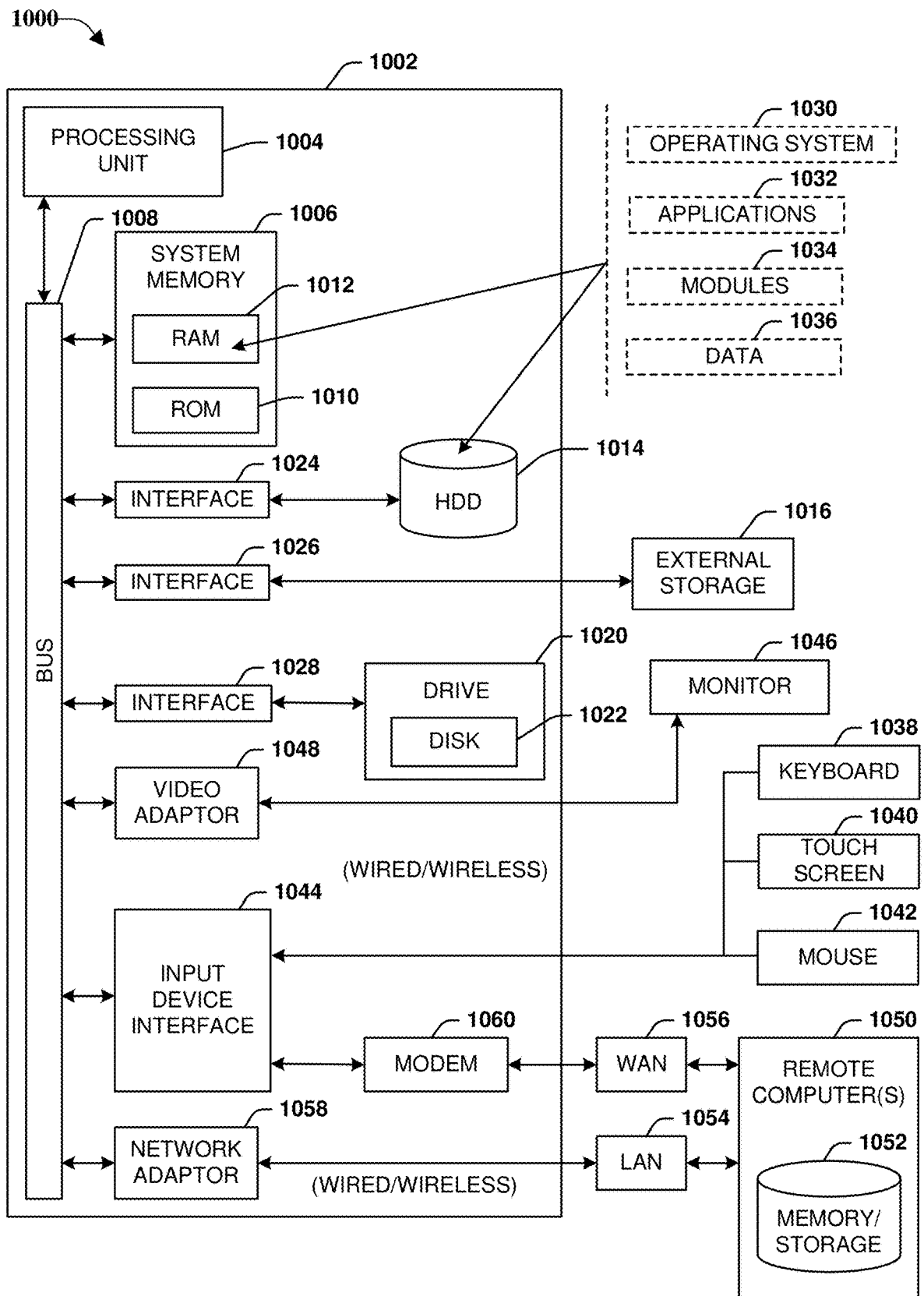
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

FIG. 10 depicts an example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid-state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. Network equipment, comprising:
a processor; and
a memory that stores executable instructions that, when executed by the processor, facilitate performance of operations, comprising:
receiving a first communication, directed to a second device from a third device associated with a first telephone identifier,
determining that the first communication comprises a reference to a second telephone identifier different from the first telephone identifier, resulting in a first identifier discrepancy, and
based on the first identifier discrepancy and an analysis of the first communication, preventing communication of the first communication to the third device.

2. The network equipment of claim 1, wherein the analysis comprises identifying the first identifier discrepancy as an unauthorized identifier discrepancy indicative that the first telephone identifier is unauthorized.

3. The network equipment of claim 2, wherein identifying the first identifier discrepancy as the unauthorized identifier discrepancy is based on an identifying characteristic of the third device.

4. The network equipment of claim 3, wherein the identifying characteristic comprises an identity of a controller of the third device.

5. The network equipment of claim 1, wherein the analysis comprises analyzing an operation of the third device.

6. The network equipment of claim 1, wherein the operations further comprise:
determining that a second communication comprises data corresponding to a second identifier discrepancy;
based on the second identifier discrepancy and an analysis of the second communication, identifying the second identifier discrepancy as an authorized identifier discrepancy; and
based on the authorized identifier discrepancy, delivering the second communication.

7. The network equipment of claim 6, wherein the analysis of the second communication comprises identifying a first indication in the second communication that authenticates the second communication as comprising the authorized identifier discrepancy.

8. The network equipment of claim 1, wherein the analysis of the first communication comprises identifying a second indication in the first communication that indicates the first identifier discrepancy is unauthorized, and wherein the preventing of the communication of the first communication to the third device is based on the first identifier discrepancy being unauthorized.

9. The network equipment of claim 8, wherein the second indication was generated as a result of an analysis of the first communication by the third device.

10. The network equipment of claim 1, wherein the second telephone identifier is for caller identification at the second device.

11. A method, comprising,
sending, by a first device comprising a processor, a communication for a second device to a third device, wherein the communication comprises a first telephone number for display at the second device that is different from a second telephone number associated with the first device, resulting in a number discrepancy; and
receiving, by the first device, an indication that the communication was not sent to the second device, wherein the indication was generated based on the number discrepancy and a result of an analysis that was performed by the third device.

12. The method of claim 11, wherein the analysis comprises identifying the number discrepancy as an unauthorized number discrepancy.

13. The method of claim 12, further comprising:
identifying, by the first device, an identifying characteristic of the first device; and
sending, by the first device, the identifying characteristic to the third device, wherein the identifying the number discrepancy as the unauthorized number discrepancy is based on the identifying characteristic of the second device.

14. The method of claim 13, wherein the identifying characteristic comprises an identity of a controller of the second device.

15. The method of claim 11, wherein the analysis comprises analyzing operation of the second device.

16. The method of claim 11, wherein the first telephone number is for display at the second device as caller identification.

17. A non-transitory machine-readable medium, comprising executable instructions that, when executed by a processor of a first device, facilitate performance of operations, comprising:

sending a communication for a second device to a third device, wherein the communication comprises a first telephone identifier number for display at the second device that is different from a second telephone identifier number associated with the first device, resulting in a number discrepancy; and receiving an indication that the communication was not sent to the second device, wherein the indication was generated based on the number discrepancy and a result of an analysis that was performed by the third device.

18. The non-transitory machine-readable medium of claim 17, wherein the analysis comprises identifying the number discrepancy as an unauthorized number discrepancy.

19. The non-transitory machine-readable medium of claim 18, wherein the operations further comprise:

identifying an identifying characteristic of the first device; and sending the identifying characteristic to the third device, wherein the identifying the number discrepancy as the unauthorized number discrepancy is based on the identifying characteristic of the second device.

20. The non-transitory machine-readable medium of claim 19, wherein the identifying characteristic comprises an identity of a controller of the second device.

* * * * *